United States Patent [19]
Torres

[11] Patent Number: 5,251,849
[45] Date of Patent: Oct. 12, 1993

[54] STRAIN REDUCED AIRPLANE SKIN

[75] Inventor: Milton J. Torres, Miami, Fla.

[73] Assignee: Florida International University for Board of Regents, Miami, Fla.

[21] Appl. No.: 456,533

[22] Filed: Dec. 26, 1989

[51] Int. Cl.⁵ .................................................. B64C 1/40
[52] U.S. Cl. .............................. 244/117 R; 244/123; 244/133
[58] Field of Search .................... 244/117 R, 119, 123, 244/133; 521/902, 176; 528/55

[56] References Cited

U.S. PATENT DOCUMENTS

| | | | |
|---|---|---|---|
| 3,160,549 | 12/1964 | Caldwell et al. | 244/119 |
| 3,229,935 | 1/1966 | Bellanca | 244/123 |
| 3,305,196 | 2/1967 | Hanlon | 244/123 |
| 3,416,756 | 12/1968 | Windecken | 244/123 |
| 4,129,697 | 12/1978 | Schapel et al. | 521/902 |
| 4,671,471 | 6/1987 | Patmont | 244/123 |
| 4,692,477 | 9/1987 | Jacobina | 521/176 |
| 4,695,618 | 9/1987 | Mowrer | 528/55 |
| 4,791,148 | 12/1988 | Riley et al. | 521/902 |

Primary Examiner—Galen Barefoot
Attorney, Agent, or Firm—Harry W. Barron

[57] ABSTRACT

An aircraft has the space between the bulkheads on the interior of the aircraft filled with a polyisocyanurate solid closed cell foam material. The foam is applied so that it adheres to both the inside of the aluminum skin of the fuselage and the facing sides of the bulkheads. The foam may be applied by either spraying or by pouring the resin with appropriate catalyst materials to cause the resin to form the foam. The foam acts to significantly strengthen the aircraft structure and thereby increase the time of usage of aging aircraft before the catastrophic failure of the adherence of the skin to the bulkheads.

20 Claims, 1 Drawing Sheet

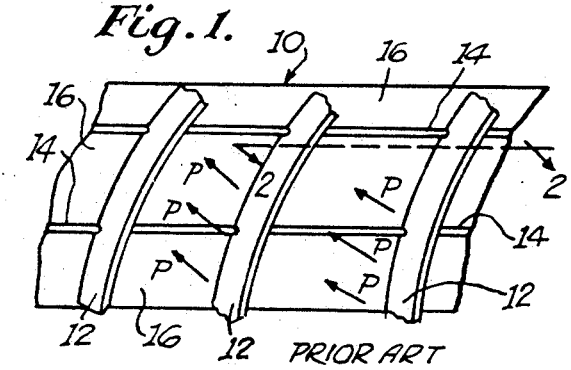
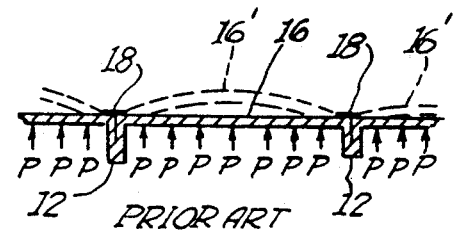
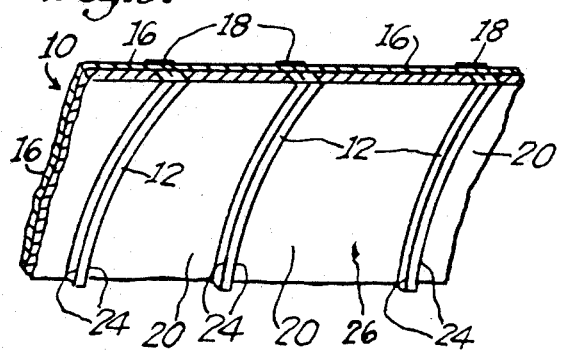
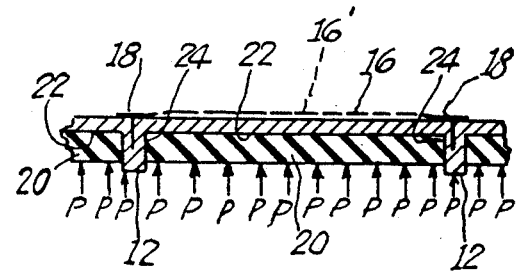
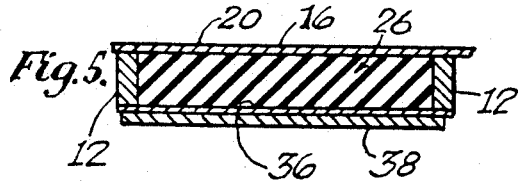
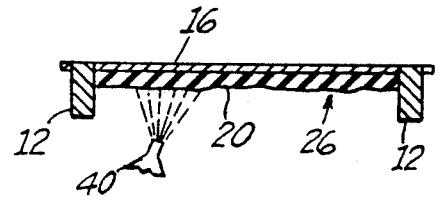
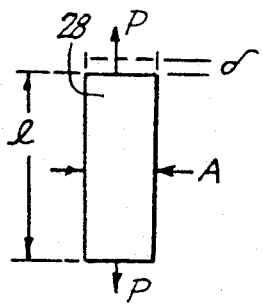
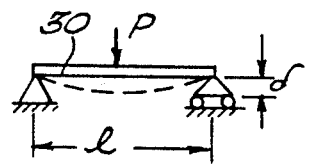
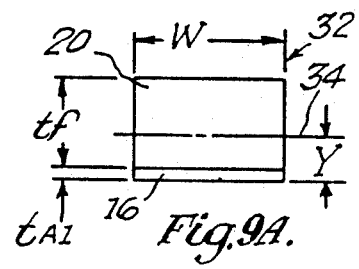
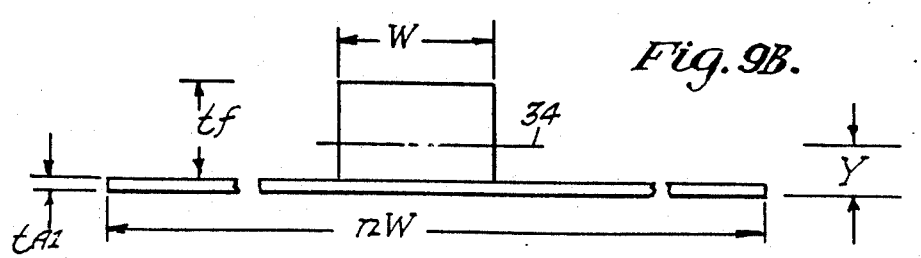

STRAIN REDUCED AIRPLANE SKIN

This invention relates to covering the inside surface of the metal skin of an airplane with a polymer foam material, and more particularly, to covering that surface with a polyisocyanurate foam entirely between adjacent bulkheads for the purpose of reducing the chance of structural failure due to metal fatigue caused by many cycles of pressurization and depressurization of the aircraft.

BACKGROUND OF THE INVENTION

As the fleet of commercial and military aircraft ages, certain time delayed problems are becoming more and more current. Among these problems, aircraft have been experiencing metal fatigue due to the cyclic cabin pressurization when climbing to cruising altitude and cabin depressurization when landing. The cyclic effect of landing and climbing to cruising altitude already has caused some aircraft structural failure and is predicted to become a major cause for the retirement of otherwise good aircraft in the coming years. The pressurization to approximately 12 pounds per square inch difference at altitude has in effect created a cold work of the aluminum alloy skin with microscopic crack propagation at certain points of the aircraft skin. The propagation of the cracks lead to metal fatigue and eventual catastrophic destruction of the skin.

Aircraft operating in the commercial or military environment must, by design, transport passengers or payload from one location to another. Particularly modern commercial jet aircraft, that typically takeoff from an airport and climb to a cruising altitude, require the cabin to be pressurized in order to maintain inside cabin pressure close to sea level pressure and thereby by assure the comfort of the passengers and crew. Because of the necessity of pressurization at higher altitudes, the pressure difference between inside the cabin and the outside ambient causes the metal skin of the aircraft to deflect, that is to bulge outward, in order to sustain the higher inside pressure.

The aluminum panels covering the fuselage section of the aircraft have sufficient strength to easily maintain structural integrity as long as the pressure is maintained constant. However, the aircraft must of necessity land to discharge the passengers and this necessitates the pressure differential between the inside of the fuselage and the ambient being reduced to zero. With a zero pressure difference, no metal deflection, or bulging is occurring. As the cycle repeats, a certain amount of internal molecular rearrangement in the aluminum panels forming the aircraft skin, occurs (similar to the cold working of metal) during each pressurization-depressurization cycle. This molecular rearrangement may displace some of the atomic crystals in the skins.

Normally, the minute amount of flexing occurring during cabin pressurization does not displace the crystal lattice of the metal significantly as long as the metal remains in an elastic deformation configuration with respect to metal stress. The pressurization-depressurization cycle continues over many tens of thousands of landings and takeoffs with corresponding cycles of the flexing of the skin. As in cold work of metals, at some point the metal becomes harder due to the rearrangement of atoms in the crystal lattice. This of course increases the resistance of the metal to yield to an applied force. When the cycles continue, small fissures start to show up near the displaced layers of atoms. These fissures allow the remaining metallic crystals to carry the load of the separated atoms, thereby increasing the stress. Stress is the product of force divided by area. The remaining atoms carrying the load now are under a greater stress. The atoms yield one by one, as would the constituents of a tug of war. The fissures are propagated into small cracks and subsequently larger cracks. At some point the remaining atoms holding the load are overwhelmed and a catastrophic failure occurs.

One solution to this problem is that the manufacturer could increase the thickness of the aluminum skin, which would give the outside wall additional strength and reduce the flexure, thereby preventing metal fatigue for close to an indefinite timespan. This solution would increase the cost and more importantly, increase the weight of the aircraft. The increased aircraft weight would, in turn, reduce the payload of the aircraft, and thereby significantly increase the per passenger mile operating cost. Moreover, this solution is not practical for the many thousands of aircraft already in service.

A better solution would be to find a technique and structure to strengthen the existing the aluminum skin of aircraft. Any practical solution to eliminate, or extend well into the future, the problem of metal fatigue by strengthening the existing aluminum skin of an aircraft must meet several requirements. First, the solution must be of reasonable cost and second, the solution must not significantly increase the weight of the aircraft. Further, any solution must not increase the fire hazard in the aircraft in the event of a crash, and particularly must not emit any noxious gases when burning. In addition, the solution should be of a type which can be used to upgrade existing aircraft, as well as being included in the manufacture of new aircraft.

One known material which could be useful to provide a solution to the metal fatigue problem is a polyisocyanurate foam material. This material has a low density, does not burn and adheres to the aluminum components of an aircraft. Further, polyisocyanurate foam material has a tensile and compressive strength sufficient to prevent the aluminum skin from fracturing and is non-soluble in any solvent typically found on an aircraft. In addition, polyisocyanurate foam is an excellent insulating material and does not absorb moisture to any significant extent.

DESCRIPTION OF THE PRIOR ART

The prior art has suggested adding various materials to the structural components and skin of an aircraft. For example, U.S. Pat. No. 1,852,146 to E. B. Carns et al, entitled, "Resilient Coating", suggests coating the structural components of an aircraft with rubber to reduce noise, corrosion and reduce component failure resulting from the massive shock of a crash. A similar shock absorbing solution to crashes for vehicles, including aircraft, is suggested in U.S. Pat. No. 3,687,401 in the name of A. E. Moore, entitled, "Light-Weight, Wreck-Resistant Cabin". This technique would not increase the slowly occurring metal fatigue failure due to the cyclic pressurization-depressurization of the aircraft, would burn and emit massive amounts of smoke and would add too much weight to the aircraft.

In U.S. Pat. No. 2,819,032, in the name of A. J. Detrie et al, entitled "Aircraft Fuselage Having A Panel Damping Material", suggests adding sheets of a wave dampening material on the inner surface of the aluminum skin for the purpose of preventing vibrations from causing structural failure of an aircraft. There is no discussion in the Detrie et al Patent about metal fatigue due to expansion and contraction during the life of the aircraft. Further, the solution suggested by Detrie et al does not solve that problem because expansion and contraction cannot be dampened. A similar damping solution with other materials is also suggested in U.S. Pat. No. 3,160,549 in the name of D. B. Caldwell et al, entitled "Vibration Damping Structure".

U.S. Pat. No. 4,235,398 in the name of William R. Johnson, entitled "Thermal Insulation For Aircraft Fuselage", shows an airplane fuselage having a polyurethane foam attached to the inside of the aluminum skin by a matrix of standoffs for the purpose of thermal insulation. The type of structure suggested by Johnson will provide no inhibition against metal fatigue due to cyclic cabin pressurization and depressurization. Further, the polyurethane material will burn and emit noxious gases and should not be used in an aircraft. Other uses of polyurethane in aircraft is shown in U.S. Pat. No. 4,081,581 in the name of H. E. Littell, Jr., entitled "Laminated Aircraft Windshield".

Polyisocyanurate resins are described in U.S. Pat. No. 3,211,703 in the name of L. G. Gilman et al, entitled "Polyaliphatic Polyisocyanurate Laminating Resin Prepared In The Presence Of A Cocatalyst System".

Polymer foams have been used to strengthen aircraft wings, as indicated by U.S. Pat. No. 3,519,228 in the name of L. J. Windecker, entitled "Airfoil Structure" and U.S. Pat. No. 3,645,481 in the name of L. R. Purdy, entitled "Airfoil Structure". The problem being solved by these patents, however, is unrelated to the problem of metal fatigue caused by the cyclic pressurization-depressurization of the fuselage of the aircraft.

SUMMARY OF THE INVENTION

In accordance with one aspect of this invention, there is provided in an airplane body formed by a thin metal material affixed to a plurality of bulkheads, the improvement of affixing a non-flammable polymer foam material to the interior side of the metal material and to the bulkheads.

In accordance with a second aspect of this invention, there is provided a method of strengthening the skin of an aircraft, such skin being affixed over a plurality of spaced bulkheads. The method comprises the step of affixing a layer of a polymer foam material between the interior side of the skin and the facing sides of the bulkheads.

BRIEF DESCRIPTION OF THE DRAWINGS

One preferred embodiment of the subject invention is hereafter described with specific reference to the following Figures, in which:

FIG. 1 shows a perspective view of a conventional aircraft fuselage structure of the prior art;

FIG. 2 shows a cross-sectional view, taken across lines 2—2 of FIG. 1, of the aluminum skin and bulkheads of the structure shown in FIG. 1;

FIG. 3 shows a perspective view of the aircraft fuselage structure having a polyisocyanurate foam material affixed to the inner surface of the aluminum skin and to the facing sides of the bulkheads;

FIG. 4 shows a cross-sectional view of the aluminum skin and bulkheads of the structure shown in FIG. 3;

FIG. 5 shows one technique of affixing the polyisocyanurate foam;

FIG. 6 shows another technique of affixing the polyisocyanurate foam;

FIG. 7 shows an axially loaded member having a force P from each end thereof;

FIG. 8 shows a beam member being deflected by a force P; and

FIG. 9A show a composite beam of foam material affixed to a thin sheet of aluminum; and FIG. 9B shows the foam material equivalent of the composite beam shown in FIG. 9A.

DETAILED DESCRIPTION

Referring to FIGS. 1 and 2, a section of the fuselage 10 of a conventional aircraft is shown. Fuselage 10 is framed by bulkheads 12 and stringers 14 in a known manner and enclosed by thin sheets of aluminum forming skin 16. The skin is typically forty mils (0.04 inches) thick surrounding the fuselage 10, although in certain high stress areas, such as around the cockpit at the front of the fuselage 10, the thickness may be as much as eighty mils thick. The sheets of aluminum skin 16 are affixed to the bulkheads 12 by conventional fastening means, such as rivets 18.

After an aircraft takes off and climbs to altitude, the air pressure within fuselage 10 is maintained at approximately one atmosphere in order to provide for the comfort of the passengers. However, the air pressure outside of the aircraft decreases to close to nothing at cruising altitudes around 40,000 feet. This creates a pressure P against skin 16 in a direction outward from fuselage 10. The pressure P causes skin 16 to expand to a position 16', as seen in FIG. 2. This expansion is limited by rivets 18 into bulkheads 12, whereby the skin between each pair of adjacent bulkheads is expanded. This expansion creates particular stress at the rivets 18 holding the skin against the bulkheads. When the aircraft lands, the pressure P difference between the interior of the aircraft and the ambient is reduced to zero and the skin returns to the non-expanded shape 16 seen in FIG. 1.

After many cycles of expansion and contraction, metal fatigue failure can occur and the skin can become dislodged from the rivets 18 at the bulkheads 12 and fall off the aircraft. If this occurs when the aircraft is aloft, an almost instantaneous depressurization of the fuselage 10 occurs, with the possibility of loss of life and property and almost assured damage.

Referring now to FIGS. 3 and 4, an improved construction of an aircraft fuselage 10 is shown. In FIGS. 3 and 4, identical components previously described with respect to FIGS. 1 and 2 are given identical reference numerals. The only thing that has been added to the structure shown in FIGS. 3 and 4, relative to the structure shown in FIGS. 1 and 2, is the layer of polyisocyanurate foam 20 which has been formed between the inner surface 22 of aluminum skin 16 and the facing edge surfaces 24 of bulkheads 12. Polyisocyanurate foam 20 is a well known closed cell foam material and is generally used as an insulator in refrigeration systems. This material has many advantages over other foam materials, such as polyurethane, which would make it useful in an aircraft. However, it has not heretofore been used in any aircraft applications.

The useful properties associated with polyisocyanurate foam are that it will not burn, it has a low density of not less than two pounds per cubic foot, and it adheres to aluminum very well. Further, polyisocyanurate foam is an excellent thermal insulator and absorbs virtually no moisture. In addition, it is insoluble in any solvent typically associated with an airplane, such as gasoline, kerosene or cleaning agents typically used. The one property of polyisocyanurate foam which make it particularly advantageous as shown in FIGS. 3 and 4 is that the compressive and tensile strength is about 35 pounds per square inch, which is much greater than the approximately 12 pounds per square inch pressure differential between the pressurized interior of fuselage 10 and the ambient at cruising altitudes. While polyisocyanurate foam has particular advantages, other closed cell polymer foams may be used, such as polyurethane foams, if one is willing to accept the risk of flammability of such material in the event of a crash.

As seen in FIGS. 3 and 4, foam 20 is provided in the channels 26 formed by the inner side 22 of skin 16 and the facing sides 24 of bulkheads 12. Foam 20 may be applied by either pouring the polyisocyanurate resin in each channel 26, as will be explained hereafter with respect to FIG. 5, or by spraying the polyisocyanurate resin in each channel 26, as will be explained hereafter with respect to FIG. 6. Regardless of how the polyisocyanurate resin is applied, it expands by about thirty times and adheres to the aluminum of both the surface 22 and surfaces 24 within the channel 26, thereby creating a unitary structure. The amount of stress required to de-laminate the foam 20 from the aluminum surfaces 22 and 24 is greater than the foam itself, and thus, the foam will be pulled apart before it de-laminates.

Referring now to FIGS. 5 and 6, the manner of applying polyisocyanurate foam 20 over aluminum skin 16 will now be described. There are two ways in which the foam 20 may be applied and these two ways are by pouring, as indicated by FIG. 5, and by spraying, as indicated by FIG. 6. Whether the foam 20 is to be applied by pouring or spraying, the polyisocyanurate resin initially applied will increase in volume by about thirty times in forming the polyisocyanurate foam 20. In addition, the amount of strength required must be determined and this determination is, in part, based upon the distance between bulkheads. It is suggested that where the bulkheads 12 are separated by three feet, two inches of foam 20 be applied; that where the bulkheads 12 are separated by six feet, three inches of foam 20 be applied and where the bulkheads 12 are separated by up to nine feet, four inches of foam be applied.

Referring first to FIG. 5, the method of pouring the polyisocyanurate resin to form the polyisocyanurate foam 20 will be described. In order to pour any resin to form a foam, a form must be created by closing channel 26 in order to contain the resin and resulting foam 20. Because of the shape of bulkheads 12 in an aircraft are generally closed loop non-circular shapes and further, since the bulkheads 12 are not uniform in size or shape throughout an airplane, apparatus must be developed adaptable for use on many different size and shaped bulkheads. As seen in FIG. 5, this apparatus includes a thin sheet 36, such as commercially available heavy duty aluminum foil or fiberglass sheeting, and a flexible backing 38. Backing 38 may be a series of laterally expandable narrow strips hingedly affixed together and sized to fit against adjacent bulkheads 12. Backing 38 may be designed to position foil 36 either against the inward facing edges of the bulkheads 12, as shown in FIG. 5, or within channel 26 if the desired thickness of foam 20 is less than the thickness of channel 26. By making backing apparatus 38 adjustable and flexible, it may be used to pour the resin for many different shaped bulkhead 12 shapes.

When utilizing the pouring method of FIG. 5, the aluminum foil 36 remains in place after the foam 20 has formed from the poured resin. Foil 36 then acts to provide additional strength and further as a vapor barrier to prevent any moisture absorption by foam 20. In pouring the polyisocyanurate resin, a calculation of the volume enclosed in channel 26 by the backing apparatus 38 and foil 36 is first made and the proper amount of resin is added to fill that volume. Approximately two pounds of resin per cubic foot of enclosed channel 26 volume may be used. If too much resin is added, the resulting excess foam 20 will have to be removed by mechanical means, such as knives, saws or other cutters, since no solvent is available to remove the foam without damaging the aluminum components 12 and 20. Each pour should be for a portion of each closed loop channel 26 in order to control the application of the material. However, a plurality of backing apparatus 38 and foil 36 may be set in place for portions in different channels 26 and each may be poured at generally the same time. It should be noted that it only requires a few minutes for the poured resin to form the foam.

Referring now to FIG. 6, the polyisocyanurate resin may be applied by using existing spraying apparatus 40. Such apparatus is commonly used to spray urethane foam resins in other applications, such as wall insulation. Because converting the polyisocyanurate resin to a solid foam requires a two step catalyzation, extreme care in the spraying application is required. The amount of resin sprayed in channel 26 is to be commensurate with the desired thickness of the resulting foam 20 and this can be learned by the person operating the spraying equipment 40 with practice. It may be necessary to clean the aluminum surfaces within channel 26 with a solvent to remove grease and dirt prior to spraying the foam. This is particularly true for retrofitting existing aircraft and may also be necessary for new aircrafts as well. This cleaning may also be necessary when pouring the resin, as shown in FIG. 5. One solvent which may be used is methylene chloride.

In the spraying application, the resin should be applied to a single closed loop channel 26 at the same time. The time required for the liquid resin to turn into the solid foam is sufficient to permit an entire channel to be sprayed during a common application. Again, if excess foam is formed, it may be removed by mechanical cutter means, such as knives and saws.

The applied foam 20 and aluminum skin 16 act as a composite unit and the resulting deflection between skin 16, during no pressurization, and skin 16', during pressurization, is substantially reduced, as seen in FIG. 4. This precludes additional slip dislocations from occurring in the metal due to maintaining the stresses well into the elastic region of the stress/strain curve. The principal function of the polyisocyanurate foam layer 20 is to add mechanical strength. Not only does foam 20 act as a composite, but the aluminum skin 16 is strengthened by having a support at every point throughout its surface area. Should a crack occur in the future for some reason, it is held to the foam 20 and not allowed to buckle into the slipstream. Further, foam 20 acts as a block to prevent the escape of air and subsequent depressurization of the fuselage 10 as a result of a small crack.

In addition to adding strength and preventing depressurization, the foam 20 acts as an excellent noise and thermal insulator, as well as acting as a barrier to fire and heat in the event of a crash and provide those extra few minutes for the passengers, during which time firecrews may be able to extinguish the fire. Further, if a crash or ditch occurs over water, the low density of foam 20, acts as additional flotation and could prevent the aircraft from sinking.

In order to calculate the theoretical stiffness of the aluminum/polyisocyanurate composite material, reference is made to FIGS. 7, 8, 9A and 9B. These calculations are based upon a spraying application in which no backing aluminum foil sheet 36. The calculations for this type of a beam would provide better results.

Referring now to FIG. 7 an axial loaded member 28 having a length 1 and a width A is shown. When a force P is applied in opposite directions from the two ends of member 28, member 28 expands by an amount $\delta$. The amount $\delta$ may be determined according to the equation:

$$\delta = P \cdot l / A \cdot E$$

where E is Young's Modulus for the material of member 28. The stiffness of member 28 may then be expressed as:

$$\text{Stiffness} = P/\delta = A \cdot E/l$$

FIG. 8 shows a member 30, which may be either a single material, such as aluminum, beam or a composite material, such as foam covered aluminum, beam. For member 30, the deflection $\delta$ may be expressed by the equation:

$$\delta = P \cdot l^3 / 48 E \cdot I$$

and the stiffness may be expressed as:

$$\text{Stiffness} = P/\delta = 48 \cdot E \cdot I/l^3$$

To determine the increase in strength of a foam and aluminum composite member 30 over an aluminum member alone, one must determine the stiffness ratio, which is:

$$\text{Stiffness Ratio} = (\text{Stiffness})_c / (\text{Stiffness})_{Al}$$

or $$= E_c \cdot I_c \cdot l^3_{Al} / E_{Al} \cdot I_{Al} \cdot l_c^3$$

where I is the Moment of Inertia of the particular beam.

Referring to FIG. 9A, the aluminum skin 16 and foam 20, as constructed according to FIGS. 3 and 4, is schematically shown as the composite beam 32. This composite beam 32 has a width W and the thickness of the foam 20 is $t_f$, the thickness of the aluminum 16 is $t_{Al}$, and the neutral axis 34, is y. Since the width of the aluminum skin 16 and foam 20 is the same, the stiffness ratio can be expressed as:

$$\text{Stiffness Ratio} = E_c I_c / E_{Al} I_{Al} \qquad [1]$$

One can determine the Young's Modulus E for both Aluminum and polyisocyanurate foam from available handbooks and find that:

$$E_f / E_{Al} = 1/n = 1/40$$

Since n=40, the composite beam of FIG. 9A may be shown as in FIG. 9B. Thus, the neutral axis 34 may be found by the equation:

$$(w t_f)\cdot(t_f/2 + t_{Al}) + (n w t_{Al})(t_{Al}/2) = y \cdot (n \cdot w \cdot t_{Al} + w \cdot t_f)$$

or $$y = (t_f^2/2 + n \cdot t_{Al}^2/2 + t_f t_{Al})/(n \cdot t_{Al} + t_f) \qquad [2]$$

From FIG. 9B, the moment of Inertia $I_c$ can be calculated as:

$$I_c = (w \cdot t_f^3)/12 + (w \cdot t_f)\{(t_f/2) + t_{Al} - y\}^2 + (n \cdot w \cdot t_{Al}^3)/12 + (n \cdot w \cdot t_{Al})\{y - (t_{Al}/2)\}^2 \qquad [3]$$

The moment of inertia for the aluminum skin 12 is:

$$I_{Al} = w \cdot t_{Al}^3 / 12 \qquad [4]$$

From equation [1], the stiffness ratio then becomes:

$$\text{Stiffness Ratio} = (1/n) \cdot (I_c/I_{Al}) \qquad [5]$$

and a calculation of the stiffness ratio of Equation [5] using equations [3] and [4] yields the following results:

TABLE I

| Thickness (inches) | | |
|---|---|---|
| Aluminum | Foam | Stiffness Ratio |
| 0.04 | 0.5 | 180 |
|  | 1.0 | 1172 |
|  | 1.5 | 3471 |
|  | 2.0 | 7461 |
| 0.05 | 0.5 | 99 |
|  | 1.0 | 642 |
|  | 1.5 | 1912 |
|  | 2.0 | 4122 |
| 0.06 | 0.5 | 61 |
|  | 1.0 | 392 |
|  | 1.5 | 1172 |
|  | 2.0 | 2534 |
| 0.07 | 0.5 | 40 |
|  | 1.0 | 258 |
|  | 1.5 | 773 |
|  | 2.0 | 1677 |
| 0.08 | 0.5 | 28 |
|  | 1.0 | 180 |
|  | 1.5 | 539 |
|  | 2.0 | 1172 |

Thus, when one applies two inches of polyisocyanurate foam 20 over a forty mil thick aluminum skin 16, the composite material has a stiffness 7461 times as great as the aluminum skin 16 alone. Accordingly, the amount of deflection of the skin of fuselage 10 with foam 20 applied will be significantly less and the metal fatigue problem will be correspondingly reduced.

What is claimed is:

1. In an aircraft body formed by a thin metal material affixed to a plurality of bulkheads, the improvement of a non-flammable polymer foam material affixed to the interior side of said metal material and to said bulkheads.

2. The invention according to claim 1 wherein said polymer foam material has a compressive and tensile strength sufficient to prevent said metal material from fracturing due to the expansion and contraction of said metal material resulting from the continual pressurization and de-pressurization of said aircraft.

3. The invention according to claim 2 wherein said polymer foam material is a closed cell material.

4. The invention according to claim 3 wherein said polymer foam material is an insulating material.

5. The invention according to claim 4 wherein said polymer foam material is polyisocyanurate foam.

6. The invention according to claim 1 wherein said polymer foam material is a closed cell material.

7. The invention according to claim 1 wherein said polymer foam material is an insulating material.

8. The invention according to claim 1 wherein said polymer foam material is polyisocyanurate foam.

9. The invention according to claim 8 wherein said polyisocyanurate foam is applied with a thickness of at least approximately two inches.

10. The invention according to claim 1 wherein said polymer foam material is applied with a thickness of at least approximately two inches.

11. A method of strengthening the skin of an aircraft, such skin being affixed over a plurality of spaced bulkheads, said method comprising the step of:

affixing a layer of a polymer foam material to the interior side of said skin and the facing sides of said bulkheads.

12. The method according to claim 11 wherein said foam material is selected to have a compressive and tensile strength sufficient to prevent said skin from fracturing due to the expansion and contraction of said skin resulting from the continual pressurization and depressurization of said aircraft.

13. The method according to claim 12 wherein said foam material is a polyisocyanurate foam.

14. The method according to claim 12 wherein said step of affixing includes affixing said foam material with a thickness of at least approximately two inches.

15. The method according to claim 12 wherein said step of affixing includes spraying materials on the interior side of said skin between adjacent bulkheads to cause said foam material to thereafter form.

16. The method according to claim 15 wherein said foam material is a polyisocyanurate foam.

17. The method according to claim 16 wherein said method further includes cleaning said skin interior surface and facing surfaces of said bulkheads.

18. The method according to claim 12 wherein said step of affixing includes placing a pliable material against the interior side of said bulkheads and pouring said polymer material to form said foam material between the interior of said skin and said pliable material.

19. The method according to claim 18 wherein said foam material is a polyisocyanurate foam.

20. The method according to claim 11 wherein said foam material is a polyisocyanurate foam.

* * * * *